July 10, 1951     A. H. EDWARDS     2,559,857
SEAL
Filed Oct. 28, 1948
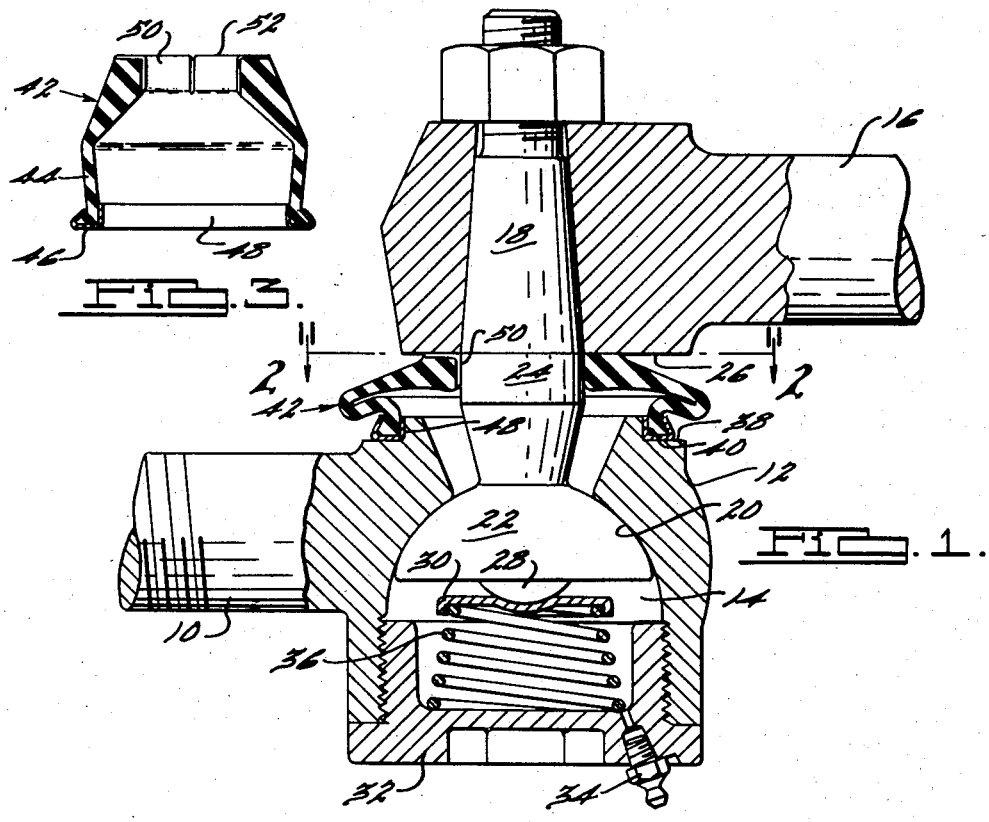
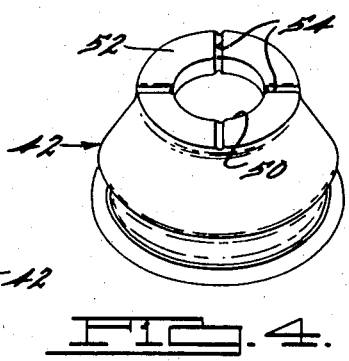
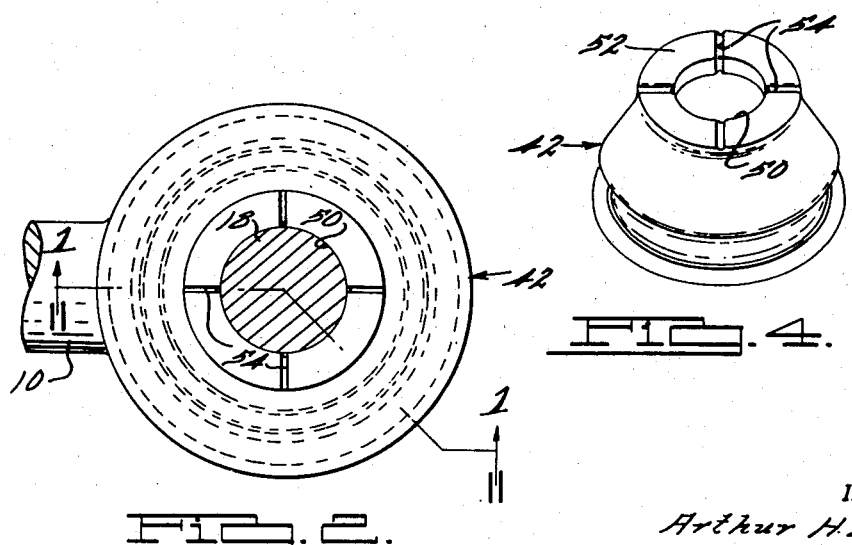
INVENTOR.
Arthur H. Edwards.
BY Harness and Harris
ATTORNEYS.

Patented July 10, 1951

2,559,857

UNITED STATES PATENT OFFICE 2,559,857

SEAL

Arthur H. Edwards, Farmington, Mich., assignor to Chrysler Corporation, Highland Park, Mich., a corporation of Delaware Application October 28, 1948, Serial No. 57,037

4 Claims. (Cl. 287—90)

This invention relates to a seal and more particularly to a seal for the cooperating portions of a pair of relatively movable members adapted for limited universal movement such as employed in the steering mechanism of a motor vehicle. These joints usually comprise a stud having an end portion which is partially spherical and which extends into a socket associated with the other cooperating member. It is common knowledge that sealing mechanisms associated with these joints are located in close proximity to the ground where they are exposed to dust, dirt and stones displaced by movement of the vehicle. A seal in order to meet the requirements must be capable of sealing the joint against the entry of foreign matter and also of retaining lubricant therewithin.

It is a principal object of the present invention to provide an oil resistant synthetic rubber seal which provides greater flexibility and tear resistance.

It is a further object of the invention to provide a seal constructed and arranged so that the only possible entrance for foreign matter is also used for the extrusion of excess lubricant. Such construction assures that any foreign matter which does manage to work its way into the seal is ejected when the vehicle is lubricated.

It is also an object of the invention to utilize the compression of a flexible member to induce a vertical force which forces cooperating sealing surfaces together.

Other objects and advantages of the invention will be more apparent from the following description taken in connection with the accompanying drawings in which:

Fig. 1 is a fragmentary vertical section of a joint having my improved seal associated therewith;

Fig. 2 is a transverse section taken on the line 2—2 of Fig. 1;

Fig. 3 is a vertical section of the seal prior to installation; and

Fig. 4 is a perspective view of the seal prior to assembly.

In Fig. 1 a sealed joint is illustrated. A tie rod 10 which extends transversely of a vehicle (not shown) is provided with a housing 12 having an axial bore 14 extending therethrough. A steering knuckle 16 has a stud member 18 secured thereto. The stud member 18 is partially disposed within the housing 12 in the bore 14. The housing 12 defines a segmental spherical bearing surface 20 for receiving a portion of the stud 18 having an outside segmental spherical bearing surface 22. The stud 18 has a cylindrical surface 24 adapted to serve as a sealing surface. The steering knuckle 16 is provided with a sealing surface 26 which extends in a direction perpendicular to the surface 24 of stud 18.

The stud 18 is preferably provided with a rounded end portion 28 immediately below the segmental spherical portion 22 thereof. A dished cap 30 is positioned in the bore 14 in contact with the rounded end portion 28 of stud 18. A cap 32 is threaded into housing 12 and carries a conventional grease nipple 34 for the insertion of lubricant into bore 14. A coiled spring 36 is held under compression between the cap 32 and the dished cap 30. The spring 36 urges the dished cap against the stud end and holds the stud in operative position within the housing 12. The spring 36 automatically compensates for wear and urges the bearing parts into proper adjustment. The housing 12 has the upper surface in Fig. 1 thereof formed to provide a shoulder 38 and a surface 40 extending at right angles to shoulder 38 for the reception of one end of the seal to be described.

My improved seal is designated by the numeral 42 and is illustrated in its unassembled position in Fig. 3 and in its assembled position in Fig. 1. Prior to assembly the seal 42 has an external appearance resembling two frusto-conical elements united at their major bases. Referring to Fig. 3 it will be seen that the body portion 44 of the seal 42 is formed of resilient material. This material is preferably synthetic rubber such as a neoprene compound although rubber or other substances could be substituted without departing from my invention. One end of the body portion 44 has a metal ring 46 secured thereto so that relative rotation between the body portion and the metal ring is prevented. The other end portion of the body 44 is formed of relatively thick walls which are not readily deflectable. The body 44 is hollow and is provided with aligned openings 48 and 50. The opening 50 is adapted to engage the surface 24 of stud 18 while the opening 48 is adapted to surround the surface 40 of tie rod housing 12. It should be noted that the relatively thin walls in the lower portion (in Fig. 3) of the body are relatively easily deflectable and that the convex shape of the body portion guides the distortion so that during assembly when the seal is compressed the diameter of the body increases in the plane of the bases of the above mentioned frusto-conical elements. It should be noted that the overall height of the seal is greater than the distance between shoulder 38 and surface 26 so that the body 44 is deformed as shown in Fig. 1 during assembly. This compression of the body 44 provides axial force which constantly urges the thickened end portion of body 44 into engagement with surface 26 to provide a seal at their mating surfaces. At the other end of the seal 42 the ring 48 is press fitted around the surface 40 of housing 12.

The relatively thick end portion of the seal 42 surrounds the stud 18 with the stud penetrating the opening 50. The seal 42 is provided with a relatively flat sealing surface 52 adapted to engage surface 26 with the pressure induced by the compression of seal 42 during assembly. The engagement of surface 24 of stud 18 by seal 42 is preferably rather tight so that foreign matter cannot work its way between the stud and the seal although relative rotation is permitted between the stud and the seal. The thickened end portion of the seal resists deformation sufficient so that when universal movement is encountered the seal is not separated from surface 26 or surface 24 by distortion.

The internal periphery of the opening 50 and the surface 52 are preferably provided with a plurality of grooves 54 which provide a passage for the extrusion of lubricant when additional lubricant is admitted by the grease nipple 34. It should be noted that when lubricant is forced through the grease nipple 34 it fills the axial bore 14 and works its way between surfaces 22 and 20 and fills the interior of the seal. The only possible entrance for foreign matter is thus along the surfaces 26 and 24 and any dirt thus admitted lies on the top of the lubricant contained within the seal. Before the dirt can be harmful it must work its way down to the surfaces 22 and 20. However, the addition of additional lubricant through the nipple 34 extrudes the dirt in question through the grooves 54.

I claim:

1. A resilient element adapted to seal a joint having limited universal movement comprising a hollow body having first and second aligned openings therein, said body having a convex external contour and a wall thickness which gradually decreases from a maximum in the vicinity of said first opening to a smaller value at the major diameter of said convex body and a metal ring secured to said body around the periphery of said second opening, said body being provided with a sealing surface which is normal to the axes of said aligned openings, located adjacent said first opening and provided with grooves adapted to permit the escape of lubricant.

2. In a ball and socket joint adapted for limited universal movement, the combination of a first member having a socket therein and a sealing surface, a second member having a ball portion disposed in said socket and a sealing surface, a closure for one end of said socket and a seal cooperating with said surfaces to close the other end of said socket, said seal comprising a resilient element having a first end thereof fixed to a metal collar which is secured to said first member in contact with said first surface so that relative movement between said first end and said first member is prevented, said resilient element being under compression and having a second end thereof surrounding said second member and being provided with a sealing surface forced into contact with the sealing surface of said second member by the forces of compression, said second end accommodating relative rotation between said element and said second member, and having a relatively thick cross section resisting deformation of said second end as an incident to universal movement of said members, said relatively thick cross section extending to an intermediate portion of said seal and a relatively thin and easily distortable portion extending from said intermediate portion to said first end to accommodate deformation of said seal during the universal movement.

3. A resilient element of circular cross section adapted to seal a joint having limited universal movement and comprising in its relaxed state a hollow body having first and second axially aligned openings therein, said element having a first portion defining said first opening and having a frusto-conical wall of substantially uniform thickness and a bead extending around the external periphery of the wall portion defining said first opening, said frusto-conical wall having its portion of largest diameter disposed in the intermediate portion of said element and said element having a second portion defining said second opening and having a frusto-conical wall integrally joined to the portion of largest diameter of the wall of said first portion, said second opening being formed in an end portion of said second portion and said end portion having a smaller diameter than the intermediate portion of said element, the inner and outer surfaces of the wall of said second portion diverging from each other at the region of joinder with said first portion so that the wall thickness of said second portion is of gradually increasing thickness.

4. A resilient element of circular cross section adapted to seal a joint having limited universal movement and comprising in its relaxed state a tubular body terminating at each end in a sealing surface having an axial opening therein, said body defining a first wall portion adjacent one end thereof having a uniform wall thickness and a second wall portion extending from said first wall portion toward the other end of said body with a thickness which gradually increases throughout the length of said second wall portion to a maximum thickness in the vicinity of one of said sealing surfaces, said first and second wall portions each having a frusto-conical external contour with the bases of the frustums abutting in the intermediate portion of said body.

ARTHUR H. EDWARDS.

REFERENCES CITED

The following references are of record in the file of this patent:

UNITED STATES PATENTS

| Number | Name | Date |
|---|---|---|
| 887,831 | Muth | May 19, 1908 |
| 1,908,789 | Ragan | May 16, 1933 |
| 2,211,817 | Hufferd et al. | Aug. 20, 1940 |
| 2,364,176 | Waldron | Dec. 5, 1944 |

FOREIGN PATENTS

| Number | Country | Date |
|---|---|---|
| 117,036 | Australia | May 25, 1943 |